United States Patent Office 3,606,419
Patented Sept. 20, 1971

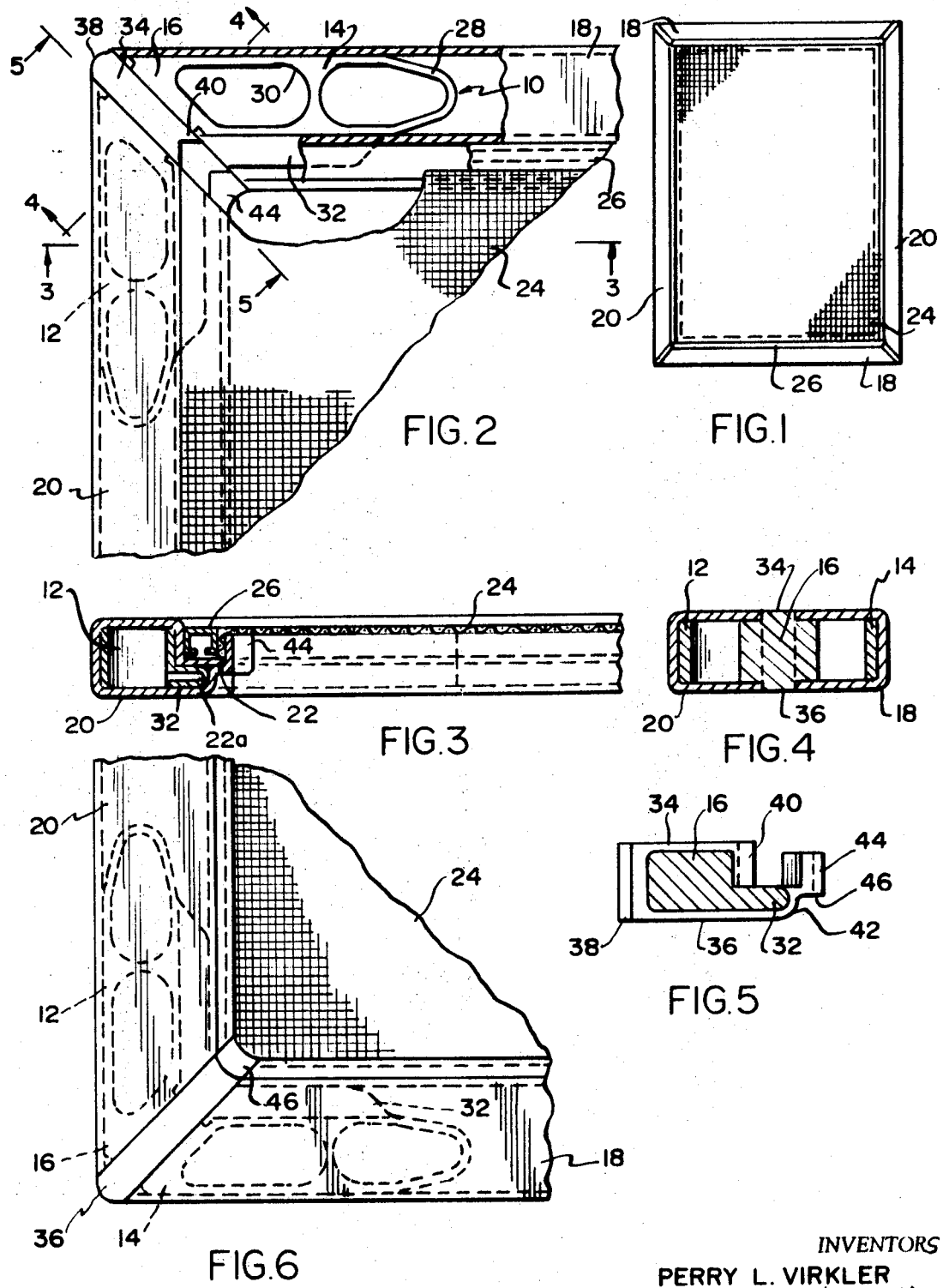

3,606,419
MOLDED PLASTIC CORNER LOCK
Perry L. Virkler, Chatsworth, and Thomas A. Vaughn, Piper City, Ill., assignors to Homeshield Industries Inc., Chatsworth, Ill.
Filed June 18, 1969, Ser. No. 834,474
Int. Cl. F16b 7/00
U.S. Cl. 287—189.36H       1 Claim

ABSTRACT OF THE DISCLOSURE

A corner lock for screen frames having right angularly disposed legs telescoped into the ends of perpendicular tubular screen frame members. The apex of the corner lock includes a projecting spacer extending diagonally on the top and bottom surface and extending vertically on the inner and outer surfaces of the apex to engage the adjacent ends of the screen frame members.

---

The present invention generally relates to screen structures and more particularly to a corner lock or connector for connecting the frame members which form the periphery of the screen structure.

An object of the present invention is to provide a corner lock for tubular frame members of unitary construction and of having an outer surface of plastic material such as nylon of the like and including a right angular member having legs telescoped into tubular frame members with projecting flanges of plastic material engaging adjacent mitered ends of the tubular frame members as a protection to a person handling the frame members.

Another object of this invention is to provide a corner lock having a radially extending projection receiving the ends of screen retaining splines disposed in channels on the inner edge of the frame members.

Still another object of the present invention is to provide a corner lock that is simple in construction, easy to assemble and relatively inexpensive to manufacture.

A further object of the present invention is to provide a screen frame section corner lock with a plastic covering at its sides for covering the unfinished ends of the engaging metal sections as a protection to someone handling the screen.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a plan view of a screen incorporating the corner lock therein;

FIG. 2 is an enlarged plan view of one corner of the screen with a portion broken away to illustrate the relationship of the corner lock thereto;

FIG. 3 is sectional view taken along section line 3—3 of FIG. 1;

FIG. 4 is a sectional view taken along section line 4—4 of FIG. 2;

FIG. 5 is a sectional view taken along section line 5—5 on FIG. 2; and

FIG. 6 is a plan view from the underside of the screen structure.

Referring specifically to the drawings, the corner lock of the present invention is generally designated by reference numeral 10 and includes a pair of legs 12 and 14 extending from an apex 16. The corner lock 10 is of unitary construction and preferably is constructed of suitable plastic material or the like, such as a plastic coated metal base.

The corner lock interconnects perpendicularly disposed tubular frame members 18 and 20 with the legs 12 and 14 telescoping into and frictionally locked to the tubular frame members.

The frame members 18 and 20 are generally rectangular in configuration and include an inwardly extending channel 22 formed along the inner edge thereof for receiving a laterally extending edge of a screen panel 24 and an anchoring spline 26 of hollow split rectangular cross sectional configuration as shown in FIG. 3. The spline 26 frictionally locks the screen panel 24 in position to form a screen assembly.

Each leg 12 an d14 has rounded ends 28 which are slightly tapered and longitudinally elongated holes 30 therein and an inwardly extending longitudial flange 32 along one edge thereof to fit into the pocket 22a defined by the bottom wall of channel 22 and an inward extension of the wall of the frame member facing said bottom wall of the channel 22.

The top and bottom surfaces of the apex 166 have a radial projection 34 and 36 thereon which engage the mitered top and bottom edges of the frame members 18 and 20. The outer edge corner of the apex 16 includes a vertical projection 38 provided with a rounded outer edge for engaging the outer corners of the frame members. The inner edge of the apex 16 includes a vertical projection 40 which engages the vertical inner edges of the frame member thus completely stabilizing the frame members for providing a rigid connection between adjacent frame members 18 and 20. Preferably the surfaces of the projections 34 and 36 provides a level surface continuity with the corresponding surfaces of the frame members 18 and 20 to facilitate stacking of the screens for packing and shipping purposes. The unfinished metal ends of the frame sections embed in the plastic of the corner lock and provide a finished junction between the corner lock and the raw unfinished end of the frame section.

The bottom edge of the apex 16 is provided with a radial inwardly extending member 42 substantially flush with the top surface of the longitudinal flanges 32. The inner end of the member 42 is provided with an upstanding member 44 parallel with the projection 40. The member 44 is of angulated cross sectional configuration and is disposed between the adjacent ends of the channels on the frame members. The space between the member 42 and projection 40 receives the edge of the screen panel and the ends of the splines.

The bottom of the member 42 is offset upwardly at 46 to conform with the exterior surface of the channel on the interior of the frame members 18 and 20.

The foregoing is considered as illustrative only of the principles of the invention. Further, since numerous modifications and changes will readily occur to those skilled in the art, it is not desired to limit the invention to the exact construction and operation shown and described, and accordingly, all suitable modification and equivalents may be resorted to, falling within the scope of the invention as claimed.

What is claimed as new is as follows:

1. A corner lock for tubular frame members of a screen structure including a screen panel, a channel along the inner edges of the frame members and splines anchoring the edge of the screen panel in the channels, said corner lock comprising an angular member having legs adapted to telescope into and frictionally engage the ends of perpendicularly arranged tubular frame members, the apex of said corner lock having a radially disposed projection on the upper and lower surfaces thereof for engaging the adjacent end edges of the tubular frame members, the apex of said corner lock including radially inwardly and outwardly extending projections for engaging the vertically disposed end edges of the tubular frame members, the ends of said legs being rounded to facilitate insertion into the tubular frame members, each of said legs including an inwardly extending longitudinal flange on the edges thereof, an inwardly extension of the wall of said frame members underlying said channels to define a pocket in which said flange is engaged, and said apex including a radially extending member terminating in an upstanding member for receiving a portion of the screen panel and the ends of the splines.

References Cited

UNITED STATES PATENTS

| | | | |
|---|---|---|---|
| 1,852,866 | 4/1932 | Weitzel | 160—381 |
| 2,717,667 | 9/1955 | Bancroft | 287—189.36HX |
| 2,989,788 | 6/1961 | Kessler | 287—189.36 |
| 3,009,516 | 11/1961 | Albee, Jr. | 160—381 |
| 3,321,885 | 5/1967 | Pratt | 160—381X |

FOREIGN PATENTS

| | | | |
|---|---|---|---|
| 1,253,291 | 1/1961 | France | 287—189.36H |

DAVID J. WILLIAMOWSKY, Primary Examiner

W. L. SHEDD, Assistant Examiner

U.S. Cl. X.R.

160—381; 287—54C

UNITED STATES PATENT OFFICE
CERTIFICATE OF CORRECTION

Patent No. 3,606,419  Dated September 20, 1971

Inventor(s) Perry L. Virkler et al.

It is certified that error appears in the above-identified patent and that said Letters Patent are hereby corrected as shown below:

Column 2, line 12, "d14" should read -- 14 --; line 19, "166" should read -- 16 --. Column 3, line 3, "inwardly" should read -- inward --.

Signed and sealed this 29th day of August 1972.

(SEAL)
Attest:

EDWARD M. FLETCHER, JR.  ROBERT GOTTSCHALK
Attesting Officer  Commissioner of Patents